March 6, 1973  A. D. LEWIS  3,719,463
METHOD OF OPENING AMPULES IN A NON-CONTAMINATING MANNER
Filed Aug. 10, 1971
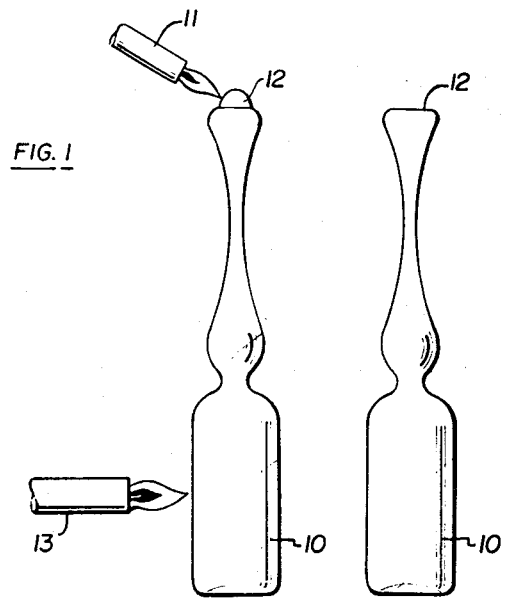
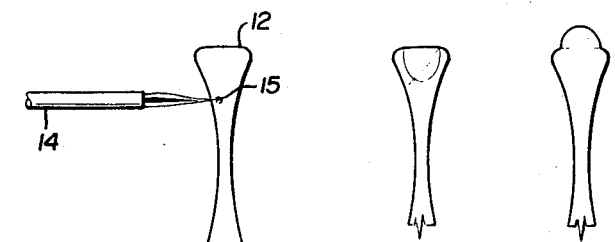
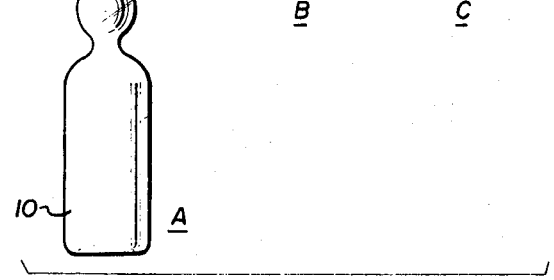
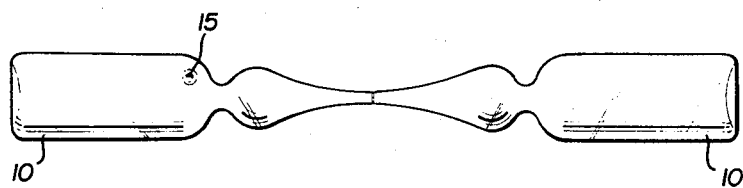
INVENTOR.
ALBERT D. LEWIS.
BY
E.F. DWYER & E.J. HOLLER.
ATT'YS.

United States Patent Office 3,719,463
Patented Mar. 6, 1973

3,719,463
METHOD OF OPENING AMPULES IN A NON-CONTAMINATING MANNER
Albert D. Lewis, Toledo, Ohio, assignor to Owens-Illinois, Inc.
Filed Aug. 10, 1971, Ser. No. 170,555
Int. Cl. C03b 23/26; B65d 1/02
U.S. Cl. 65—113  3 Claims

ABSTRACT OF THE DISCLOSURE

A method of making ampules and releasing a partial vacuum in the glass ampule, created when glass ampules are formed from tubing, by using a small hydrogen-oxygen flame about 0.005" in port diameter to effect a self-sealing hole in the ample, and equalizing atmospheric pressure within the ampule, permitting the ampule to be opened, for filling, in a subsequent operation, without drawing glass particles into the ampule, due to the in-rushing atmosphere, during the second opening procedure. Sterile water vapor, produced by the flame, fills the ampule to the exclusion of atmospheric air and maintains the interior of the ampule in its original sterile condition during the vacuum release.

The improved ampule is vacuum released, hermetically sealed and sterile.

BACKGROUND OF THE INVENTION

Field of the invention

This invention is a method of releasing a partial vacuum created within glass ampules when the ampules are formed from tubing, sealed and cooled to room temperature. A small area is heated with a very small hydrogen-oxygen flame. As the glass softens, atmospheric pressure opens the soft area and releases the partial vacuum without introducing either glass particles or bacteriological contamination. Sterile water vapor, a product of the flame, fills the vented ampule, thus maintaining the interior of the ampule in its sterile condition; and the puncture is self-sealed immediately upon vacuum release and before withdrawal of the flame.

DESCRIPTION OF THE PRIOR ART

This invention can be utilized in prior art methods of making at least two kinds of ampules. Ampules are manufactured with either a "funnel-top" or a "trimmed stem." Glass tubing is formed in an ampule-forming machine by heating and then forming the tube in the shape of an ampule, which is sealed during the manufacture, creating a partial vacuum within the ampule. In this condition, the annealed ampule is internally sterile; to open the ampules, in the prior art practice, a large diameter flame is used on the body of the ampule to increase the pressure while a sharp, concentrated flame is directed at the top thereof to melt an opening in the formed ampule; however, the procedure for opening the ampule draws into the ampule atmospheric air, which carries the small glass particles, dust, and attendant bacterial microbiological contamination. The ampule requires washing to remove this contamination and also sterilization prior to subsequent filling with pharmaceutical material. If the body of the ampule is not heated to expand the air, then the partial vacuum draws in large numbers of glass particles originating from the forming of the opening.

The above method is used for both funnel top or (when the top is trimmed) trimmed stem ampule. In both types, the upper or stem portion is discarded as a wasted piece of glass.

By making a "double body" common stem ampule, the formed ampule can be severed by mechanical means, heat shock, or flame melting; but glass particles are introduced throughout the ampules by the in-rushing of air as a result of the partial vacuum within the ampule. An application of the method of this invention is to release the vacuum prior to the severing operation so that, during any subsequent severing operation, glass chips are not brought into the body of the ampules by the in-rushing atmosphere, but are limited to the tip area of the formed ampule, and these chips are easily removed by a vibration technique or washing, prior to use by the customer, permitting the more economic manufacture of ampules through obtaining two ampules per forming machine cycle and also avoiding waste, i.e., the discarded upper stem portion.

Another application of the method of this invention permits the vacuum release and resealing of a funnel top ampule without introducing glass particles. After this vacuum release operation, single funnel top ampules can now be opened, using a prior art method, for filling a single funnel top ampule with pharmaceutical material without the usual contamination, washing and sterilization, and double body common stem ampules can be severed without introducing glass particles.

SUMMARY OF THE INVENTION

A method of releasing a partial vacuum in a sealed glass ampule, thereby equalizing the pressure in the ampule with atmospheric pressure and re-sealing the ampule without introducing glass particles or bacterial contamination. The method is the use of a very small hydrogen-oxygen flame tip, about 0.005" port diameter, so adjusted to heat the glass but not sufficient to pierce the ampule in the absence of the particle vacuum. Atmospheric pressure then forces a small vent in the glass; the pressure is equalized on both sides of the glass wall, and the vent or opening seals itself, leaving a small blemish or scar on the ampule surface. The flame tip, at a temperature of over 3,000° F., produces an atmosphere of sterile water vapor within the ampule and maintains the sterile condition present prior to piercing. The vent closes immediately upon pressure equalization and before withdrawal of the flame, due to the flow of molten glass.

BRIEF DESCRIPTION OF THE DRAWINGS

FIG. 1 shows a prior art method of opening an ampule for vacuum release.

FIG. 2 shows an ampule after use of the prior art opening method.

FIG. 3 shows the method of this invention in vacuum-releasing an ampule of the funnel top or "Tuf top" type.

FIG. 4 shows a common stem double ampule of the invention.

DESCRIPTION OF THE PREFERRED EMBODIMENT

FIG. 1 shows a prior art method of opening formed sealed ampule 10, either at a later stage of ampule manufacture or any time prior to filling, utilizing a flame 11 to soften the top 12 of the ampule and a second flame 13 on the ampule body to prevent the partial vacuum from collopsing the softened spot and causing the ampule top to assume a concave shape, as shown in FIG. 4B. The body flame expands the internal air which expands the heated top glass. The prior art method is shown to provide a better basis for understanding the improved method of this invention.

FIG. 3 shows the steps of the method of this invention. A very hot hydrogen-oxygen flame 14 with a port approximately 0.005", is applied to the ampule, and a small spot is heated on the surface of the ample. Atmospheric pressure causes a small hole to form and the products of combustion from the flame to surge into the ampule, resulting in equalized pressure within the ampule and the atmosphere. With the equalizing of pressure, the small hole in the glass seals itself almost instantly, and the flame may be withdrawn. The method of this invention preserves the sterile condition of the ampule, which can be packed and shipped to a customer. During the customer's filling operations, the thin top is pierced with a needle point flame for introducing of the filling needle. These operations on externally clean and sterile ampules are conducted under sterile conditions, eliminating the need for costly internal washing and sterilizing the ampule at severing FIG. 1 shows the prior art practice of opening an ampule for filling; a flame is used to soften a portion of the glass ampules near the top, while a second flame warms the air within the ampule and prevents the top of the ampule from collapsing inwardly, as shown in FIG. 1. A funnel top ampule, shown in FIG. 2, results when a large hole is flame-pierced in the top to permit the entry of washing and filling needles for funnel top ampules; such ampules, due to contamination on opening, packaging and shipment, require intricate and expensive interior washing and sterilization before filling. Some ampules are sold and presented to users in an unopened condition and, of course, they are not "vacuum released," but the contamination problem occurs when the customer vacuum-releases the ampule.

The method of this invention permits the vacuum-release and resealing of an ampule without introducing either glass particles or contaminated air which would result in the loss of a sterile interior condition. After vacuum release operation, the ampule is shipped to a customer for filling under sterile conditions, when a fire is used to make a port for the filling needle entry, the vacuum release operation of this invention permits forming the entry port without also introducing glass particles or spicules.

As shown in FIG. 4, double ampules can be made from a common stem double body stock without causing the glass particles to contaminate the inner body of the ampulse at severing.

This invention is a process of using a very small, hydrogen-oxygen flame with a tip about 0.005" to heat a very small area on the ampule. Atmospheric pressure then pushes open the molten glass to form a small opening, and the opening permits the equalization of atmospheric pressure within the ampule. Then, the pierced hole seals itself; however, where sterile conditions are not a concern and clean air conditions are maintained, the heating step can be done by other means, such as laser beams, etc.

FIG. 4 illustrates the formation of a double ampule with the trimmed stem, the ampule being severed at a midpoint by any severing means, such as thermal shock, into two separate ampules. This method provides an economical way to make trimmed stem ampules and results in an economic benefit by eliminating the tiny glass particles that would otherwise pervade the ampule bodies, and also eliminate waste glass "stems" and permit two ampules to be made during each forming cycle, instead of one ampule as in the prior art.

The flame is a hydrogen-oxygen mixture, which is supplied from source tanks and combined and supplied through a flame tip. The flame port is reduced in size to about 0.005". The prescribed size would not, in the absence of a vacuum in the ampule, penetrate the glass. As the flame softens the glass, the atmospheric pressure begins to push the molten glass inwardly, forming a vent until pressure within the ampule and the atmosphere are equalized. The opening in the glass immediately seals itself, due, probably, to the flow of the molten glass into the small opening.

Referring to the drawing, FIG. 1 illustrates the prior art method of vacuum releasing a sealed ampule and establishing a filling hole in the area designated 12. This is a "funnel top" ampule, as shown in FIG. 2.

FIG. 3 illustrates a sealed sterile ampule, which is formed as a result of the use of the process of the invention described herein. The surface to be opened may be flat as at "A," concave as at "B" or convex, as at "C," to suit customer preference.

FIG. 4 shows a common stem ampule of the double type, made by the process of this invention.

Applicant's invention provides two methods of making ampules that could not be made heretofore in the prior art. One is the hermetically-sealed, clean, sterile ampule that can be readily opened, filled, and re-sealed without interior contamination, such as that of the prior art funnel top ampule. The other is a common stem ampule, as shown in FIG. 4, which is formed from a one-piece tubing and severed into two trimmed stem ampules.

Heretofore, it has been considered impractical to ship such a sealed ampule to a potential user because the customer's attempt to open the ampule has resulted in the objectionable glass particles and contamination referred to hereinabove. Heretofore, it has been necessary to subsequently wash the ampule interior and sterilize prior to filling and sealing at the customer location. This method makes it possible to manufacture funnel top ampules, leaving them in heat-sealed, untrimmed condition, but vacuum-released. This permits elimination of internal washing and sterilizing of ampules prior to pharmaceutical filling—a significant cost factor in making ampules. Trimmed stem ampules can be made from double body common stem ampule stock, which permits significant cost reduction and material conservation in the manufacture of trimmed stem ampules.

What is claimed is:

1. A method of releasing a partial vacuum in a sterile glass ampule, the steps comprising:
    (a) applying a small hydrogen-oxygen flame from a port about 0.005" in port diameter to pierce a hole in the ampule, thereby releasing the vacuum; and
    (b) permitting the hole to seal, after the vacuum is released and thereby hermetically sealing the ampule, and then withdrawing the flame.

2. A method of opening a sterile glass ampule, which is in a partial vacuum from the forming operation, comprising the steps of:
    (a) applying a hydrogen-oxygen flame with a small tip about 0.005" in diameter to the ampule;
    (b) piercing a small hole in the glass through the combined effect of softened glass and pressure difference due to interior vacuum and external atmospheric pressure;
    (c) producing sterile water vapor from the flame to fill the ampule; and
    (d) equalizing interior and external pressure, permitting the hole to close, hermetically sealing the sterile water vapor within the ampule; and
    (e) withdrawing the flame.

3. A method of opening a glass ampule made from clean tubing, which is in a partial vacuum from the forming operation, comprising the steps of:
    (a) applying a hydrogen-oxygen flame with a small tip about 0.005" in diameter to the ampule;

(b) piercing a small hole in the glass through the combined effect of softened glass and pressure difference due to interior vacuum and external atmospheric pressure;
(c) producing sterile water vapor within the ampule by the flame;
(d) equalizing interior and external pressures permitting the hole to close, thereby hermetically sealing the water vapor within the ampule; and
(e) withdrawing the flame.

References Cited

UNITED STATES PATENTS

| 3,375,948 | 4/1968 | Creevy et al. | 215—32 |
| 1,888,635 | 11/1932 | Koenig | 65—113 X |
| 2,087,947 | 7/1937 | Dichter | 65—105 |

LEONARD SUMMER, Primary Examiner

U.S. Cl. X.R.

215—32